US 8,036,151 B2

United States Patent
Das et al.

(10) Patent No.: US 8,036,151 B2
(45) Date of Patent: Oct. 11, 2011

(54) POWER-BASED RATE SIGNALING FOR CELLULAR UPLINK

(75) Inventors: Arnab Das, Summit, NJ (US);
Prashanth Hande, Somerset, NJ (US);
Sundeep Rangan, Jersey City, NJ (US);
Xinzhou Wu, Urbana, IL (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 934 days.

(21) Appl. No.: 11/611,882

(22) Filed: Dec. 17, 2006

(65) Prior Publication Data

US 2008/0144582 A1 Jun. 19, 2008

(51) Int. Cl.
*G08C 17/00* (2006.01)

(52) U.S. Cl. ........ 370/311; 370/318; 370/328; 370/316; 370/248; 455/522; 455/69

(58) Field of Classification Search .................. 370/316, 370/318, 248, 537, 342, 321, 561, 115.1, 370/522, 311, 328; 455/302, 132, 63, 69, 455/522, 561, 115.1
See application file for complete search history.

(56) References Cited

U.S. PATENT DOCUMENTS

| | | | |
|---|---|---|---|
| 5,982,760 A * | 11/1999 | Chen | 370/335 |
| 6,487,416 B1 * | 11/2002 | Bundy et al. | 455/453 |
| 7,155,236 B2 | 12/2006 | Chen et al. | |
| 2003/0026324 A1 * | 2/2003 | Li et al. | 375/141 |
| 2004/0037238 A1 * | 2/2004 | Schiff et al. | 370/321 |
| 2005/0043052 A1 | 2/2005 | Whinnett et al. | |
| 2006/0030352 A1 * | 2/2006 | Kiran et al. | 455/522 |
| 2006/0194546 A1 * | 8/2006 | Gunnarsson et al. | 455/69 |
| 2006/0234752 A1 | 10/2006 | Mese et al. | |

FOREIGN PATENT DOCUMENTS

| | | |
|---|---|---|
| EP | 0991220 | 4/2000 |
| WO | WO9604718 A1 | 2/1996 |
| WO | WO9711535 | 3/1997 |
| WO | WO02052757 A1 | 7/2002 |

(Continued)

OTHER PUBLICATIONS

Andrea J Goldstein et al.: "Variable-Rate Variable-Power MOAM for Fading Channels" IEEE TR~NSACTIONS on Communications, IEEE Service Center, Piscataway, NJ, US, vol. 45, No. 10, Oct. 1, 1997, XP011 009034 ISSN: 0090-6778.

(Continued)

*Primary Examiner* — Kamran Afshar
*Assistant Examiner* — Manpreet Matharu
(74) *Attorney, Agent, or Firm* — Donald C. Kordich

(57) ABSTRACT

Systems and methodologies are described that facilitate utilizing power-based rate signaling for uplink scheduling in a wireless communications system. A maximum nominal power (e.g., relative maximum transmit power that may be employed on an uplink) may be known to both a base station and a mobile device. For example, the base station and the mobile device may agree upon a maximum nominal power. According to another example, signaling related to a maximum nominal power for utilization on the uplink may be provided over a downlink. Further, selection of a code rate, modulation scheme, and the like for the uplink may be effectuated by a mobile device as a function of the maximum nominal power. Moreover, such selection may be based at least in part upon an interference cost, which may be evaluated by the mobile device.

29 Claims, 12 Drawing Sheets

FOREIGN PATENT DOCUMENTS

| WO | WO2006099545 A1 | 9/2006 |
| WO | WO2006106616 A1 | 10/2006 |
| WO | WO2006109492 | 10/2006 |
| WO | WO2006128130 | 11/2006 |

OTHER PUBLICATIONS

Brian Clas on et al; "Channel Cod.ing for 4G Systems With Adaptive Modulation and Coding" IEEE Personal Communications, IEEE Communications Society, US, vol. 9. No. 2, Apr. 1, 2002, pp. 8-13, XP011 093848 ISSN: 1070-9916.

European Search Report—EP10164717, Search Authority—Munich Patent Office, Dec. 30, 2010.

International Search Report and Written Opinion—PCT/US2007/087796, International Search Authority—European Patent Office—Nov. 14, 2008.

Parkvall S et al: "WCD,MA Enhanced Uplink—PrinCiples and Basic Operation" Vehicular Technology Conference, 2005. VTC 2005-Spring. 2005 IEEE 61st Stockholm, Sweden May 30-Jun. 1, 2005, Piscataway, NJ. USA,IEEE, vol. 3, May 30, 2005, pp. 1411-1415, XP010855655 ISBN: 976-0-7803-8887-1.

Ulrich Turke: "Efficient Methods for WCDMA Radio Network Planning and Optimization", Sep. 25, 2007, Vieweg und Teubner, XP002614988, ISBN: 3835009036 pp. 19-19.

\* cited by examiner

POWER-BASED RATE SIGNALING FOR CELLULAR UPLINK

BACKGROUND

I. Field

The following description relates generally to wireless communications, and more particularly to utilizing power-based rate signaling for uplink scheduling in a wireless communication system.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing, (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems (e.g., OFDM systems) oftentimes schedule downlink and uplink transmissions. As an example, base stations commonly assign channels, times, frequencies, modulation schemes, code rates, and the like for mobile devices to utilize for communicating over the uplink. Base stations typically select code rates and modulation schemes, for instance, for each mobile device based upon information (e.g., link-adaptation, traffic requirements, amount of available power of the mobile device, interference costs/constraints, . . . ) periodically obtained from the respective mobile device over the uplink. Further, a base station may transmit an assignment to a mobile device over the downlink, where the assignment specifies a channel to be utilized for transmission as well as a code rate and modulation scheme. The mobile device may employ the assignment to transmit via the uplink at a rate up to the assigned code rate (e.g., depending on a number of frames, available power, . . . ). However, the mobile device may provide a coarse understanding of information utilized to determine the code rate and/or modulation scheme; hence, the base station may effectuate selecting the code rate and/or modulation scheme with less knowledge of such information as compared to the mobile device. Moreover, transmission of such information from the mobile device to the base station introduces a time delay that may lead to a lack of synchronization.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating utilization of power-based rate signaling for uplink scheduling in a wireless communications system. A maximum nominal power (e.g., relative maximum transmit power that may be employed on an uplink) may be known to both a base station and a mobile device. For example, the base station and the mobile device may agree upon a maximum nominal power. According to another example, signaling related to a maximum nominal power for utilization on the uplink may be provided over a downlink. Further, selection of a code rate, modulation scheme, and the like for the uplink may be effectuated by a mobile device as a function of the maximum nominal power. Moreover, such selection may be based at least in part upon an interference cost, which may be evaluated by the mobile device.

According to related aspects, a method that facilitates mobile-side selecting of a code rate for uplink transmission is described herein. The method may comprise selecting a code rate based at least in part upon a maximum nominal power. Further, the method may include transmitting data on an uplink with the selected code rate.

Another aspect relates to a wireless communications apparatus. The wireless communications apparatus may include a memory that retains instructions related to evaluating an interference cost, generating an adjusted maximum transmit power based upon a maximum nominal power and the interference cost, electing a code rate based upon the adjusted maximum transmit power, and transmitting data on an uplink traffic channel utilizing the elected code rate. Further, the communications apparatus may include a processor, coupled to the memory, configured to execute the instructions retained in the memory.

Yet another aspect relates to a wireless communications apparatus that elects a code rate for uplink-transmission as a function of received power-related assignments. The wireless communications apparatus may include means for evaluating an interference cost associated with an uplink; means for electing a code rate based at least in part upon the maximum nominal power and the interference cost; and means for transmitting data on the uplink utilizing the elected code rate.

Still another aspect relates to a machine-readable medium having stored thereon machine-executable instructions for analyzing an uplink interference, selecting a code rate and a modulation scheme for uplink transmission based upon the uplink interference and an assigned maximum nominal power and transmitting data with the code rate and the modulation scheme on an uplink traffic channel.

In accordance with another aspect, an apparatus in a wireless communication system may include a processor, wherein the processor may be configured to obtain an indication related to a maximum uplink transmit power relative to a dedicated power control signal. Moreover, the processor may be configured to choose an uplink code rate based upon the indication. Further, the processor may be configured to transmit traffic on an uplink utilizing the uplink code rate.

According to a further aspect, a method that facilitates providing power-related assignments for uplink transmission is described herein. The method may comprise transmitting an indication of a selected maximum nominal power for utilization on an uplink. Further, the method may include receiving data transferred on the uplink with a code rate determined based at least in part upon the maximum nominal power.

Another aspect relates to a wireless communications apparatus. The wireless communications apparatus may include a memory that retains instructions for signaling over a downlink a maximum nominal power for uplink transmission and receiving data with a code rate and a modulation selected as a function of the maximum nominal power. Further, the wireless communications apparatus may include a processor, coupled to the memory, configured to execute the instructions retained in the memory.

Still another aspect relates to a wireless communications apparatus that provides power-based rate signaling. The wireless communications apparatus may include means for sending an assignment that includes a maximum nominal power associated with an uplink transmission and means for obtaining data via the uplink with a code rate selected on a mobile side based at least in part upon the maximum nominal power.

Yet another aspect relates to a machine-readable medium having stored thereon machine-executable instructions for selecting a maximum transmit power relative to a dedicated power control signal for uplink transmission; transmitting the selected relative maximum transmit power over a downlink; and receiving data over an uplink with a code rate and a modulation elected by a mobile device based upon the selected relative maximum transmit power.

In accordance with another aspect, an apparatus in a wireless communication system may include a processor, wherein the processor be configured to choose a maximum nominal power; assign a time, frequency, and the maximum nominal power to a base station for transmission on an uplink; and obtain data transmitted over the uplink with a code rate and a modulation selected based upon the maximum nominal power.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
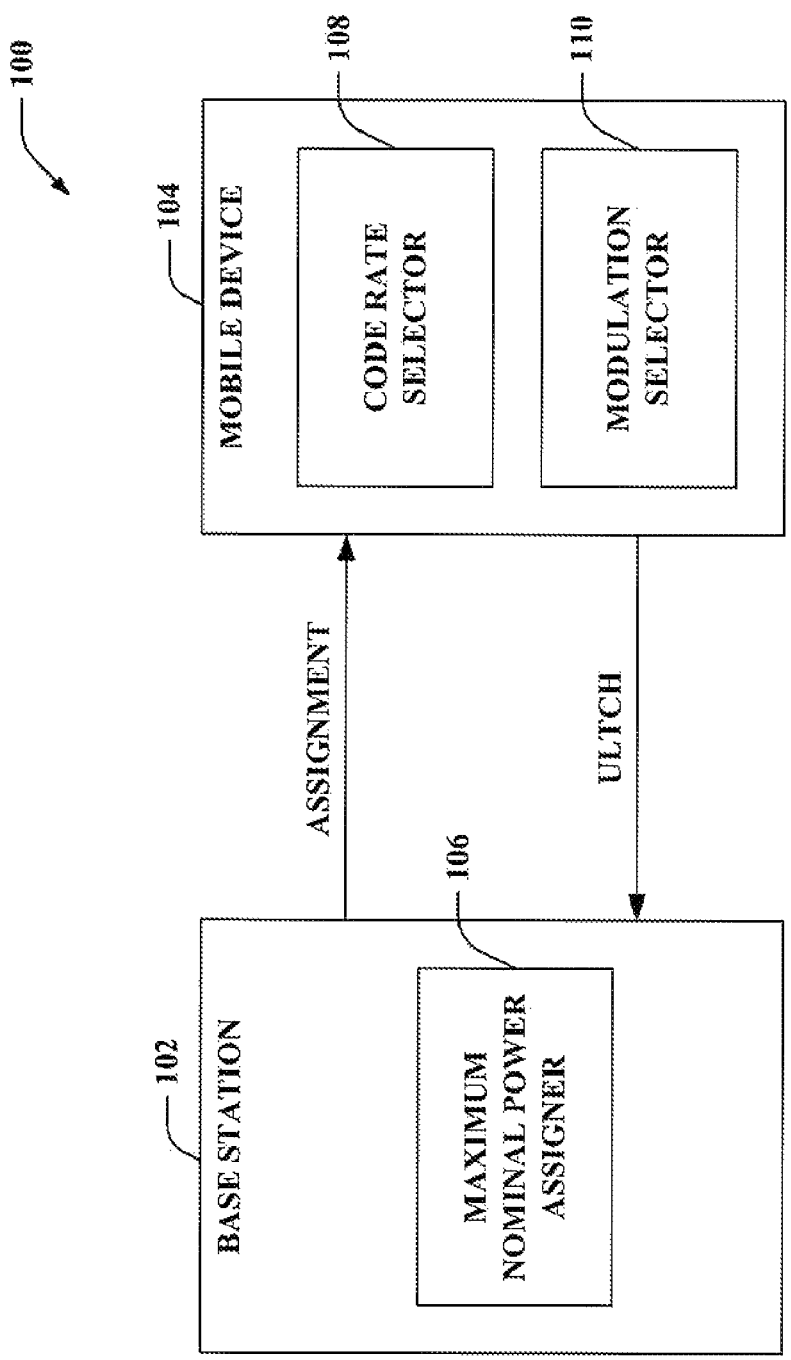
FIG. 1 is an illustration of an example wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device may refer to a device providing voice and/or data connectivity to a user. A mobile device may be connected to a computing device such as a laptop computer or desktop computer, or it may be a self contained device such as a personal digital assistant (PDA). A mobile device can also be called a system, a wireless terminal, a subscriber unit, a subscriber station, mobile station, mobile, remote station, access point, remote terminal, access terminal, user terminal, user agent, user device, or user equipment. A mobile device may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem.

A base station (e.g., access point) may refer to a device in an access network that communicates over the air-interface, through one or more sectors, with mobile devices. The base station may act as a router between the mobile device and the rest of the access network, which may include an IP network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 can comprise a base station 102 that receives, transmits, repeats, etc., wireless communication signals to a mobile device 104. Further, it is contemplated that system 100 may include a plurality of base stations similar to base station 102 and/or a plurality of mobile devices similar to mobile device 104. Base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Base station 102 may be a fixed station and/or mobile. Mobile device 104 can be, for example, a cellular phone, a smart phone, a laptop, a handheld communication device, a handheld computing device, a satellite radio, a global positioning system, a PDA, and/or any other suitable device for communicating over wireless communication system 100. Also, mobile device 104 may be fixed or mobile.

Mobile device 104 may communicate with base station 102 (and/or disparate base station(s)) on a downlink and/or an uplink channel at any given moment. The downlink refers to the communication link from base station 102 to mobile device 104, and the uplink channel refers to the communication link from mobile device 104 to base station 102. Base station 102 may further communicate with other base station(s) and/or any disparate devices (e.g., servers) (not shown) that may perform functions such as, for example, authentication and authorization of mobile device 104, accounting, billing, and so on.

System 100 employs a power-based rate signaling scheme for uplink scheduling. Base station 102 generates an assignment (e.g., which may or may not include a maximum nominal power) that is transmitted over the downlink to mobile device 104 (and/or respective assignments that may be transferred to disparate mobile devices); for example, the assignment may be transmitted/on a downlink traffic control channel (DLTCCH). Further, mobile device 104 may employ the assignment to transmit on an uplink traffic channel (ULTCH). Pursuant to an illustration, system 100 may be an Orthogonal Frequency Division Multiplexing (OFDM) system and the assignment may include an allocation of a block in time and frequency that may be employed by mobile device 104 for uplink transmission (e.g., on the ULTCH).

Base station 102 may further include a maximum nominal power assigner 106 that selects a maximum nominal power at which mobile device 104 may transmit via the uplink (e.g., ULTCH). The maximum nominal power yielded by maximum nominal power assigner 106 may be transferred to mobile device 104 as part of the assignment. For example, the maximum nominal power may be a maximum transmit power relative to a dedicated power control signal (e.g., traffic channel (TCH) to dedicated control channel (DCCH) power). The maximum nominal power may be determined according to the following factors: the system stability consideration, the loading at the different base stations in the network and the QoS of traffic flows in the network. Moreover, the maximum nominal power may be related to a maximum per tone (e.g., maximum per unit bandwidth). According to a further example, base station 102 and mobile device 104 may agree upon a maximum nominal power; thus, following this example, the assignment transferred to mobile device 104 over the downlink need not signal the maximum nominal power.

Mobile device 104 may further include a code rate selector 108 and a modulation selector 110. Code rate selector 108 may select a code rate that mobile device 108 employs for transmission on the ULTCH in response to the received assignment. Code rate selector 108 may determine the code rate based at least in part upon me maximum nominal power. Additionally, modulation selector 110 may identify a modulation scheme for mobile device 104 to utilize for the uplink transmission based upon the maximum nominal power. In comparison to conventional techniques that commonly utilize a base station to assign code rate and modulation scheme via the downlink, code rate selector 108 and modulation selector 110 enable selection of code rate and modulation scheme, respectively, at mobile device 104.

Code rate selector 108 may enable uplink transmission by mobile device 104 with any rate up to a maximum rate that corresponds to the maximum nominal power. Code rate selector 108 may elect a code rate based upon various factors. For example, code-rate selector 108 may select the code rate based upon traffic requirements of mobile device 104, an amount of available power associated with mobile device 104, an interference cost, and the like. By way of illustration, if mobile device 104 has minimal available power, traffic requirements, and so forth, code rate selector 108 may elect to utilize a code rate associated with a transmit power less than the maximum nominal power. According to a further example, the rate may be identified with code rate selector 108 based upon predetermined suggested values; thus, a transmit rate option i may be chosen with code rate selector 108 if $P_{max,nom} \geq P_{min}[i]$, where $P_{max,nom}$ is the maximum nominal power and $P_{min}[i]$ is a minimum power corresponding to the transmit rate option i. According to this example, the predetermined suggested values may be adjusted based upon ACK/NAK history. It is to be appreciated, however, that the claimed subject matter is not limited to the aforementioned examples.

By way of further example, base station 102 and mobile device 104 can agree on a default value of an interference budget, which can be referred to as the maximum nominal power (e.g., nominal interference power). Moreover, base station 102 may assign a value that indicates how much mobile device 104 can deviate from the nominal value. The deviation value may be chosen by considering various factors, which may include the QoS requirement, fairness constraint, traffic request, SNR and/or the path loss ratio of the mobile and other mobiles scheduled in other traffic tiles, which may exist in the same time slot as the current scheduling time or exist before that. At the mobile side, mobile device 104 may decide its rate (e.g., by employing code rate selector 108) based on a path loss ratio and the assigned interference budget, which may be calculated from the received adjustment and the nominal value; however, the subject claims are not so limited.

By utilizing a power-based rate signaling scheme rather than signaling the rate options, system 100 may mitigate effects of reporting delay for information conveyed to base station 102. For instance, conventional techniques may utilize periodic reports, which may indicate traffic requirements, interference costs, amounts of available power, and so forth, sent on the uplink that may be leveraged by a base station to select particular rate options; thus, a time delay may be introduced that can lead to a lack of synchronization. Further, system 100 may enhance efficiency of bandwidth utilization by reducing an amount of information transmitted over the uplink and reducing a number of bits transferred in a downlink assignment. Moreover, power-based signaling may scale to an arbitrary number of rate options, provide finer power quantization as compared to rate-based signaling, and enable greater flexibility in link adaptation and power levels. Additionally, synchronization issues with backoff or path ratio may be mitigated and link adaptation may be immune to lost assignments and null frames by employing power-based signaling associated with system 100. Also, system 100 may be more robust against report errors due to quantization errors and/or DCCH decoding errors; thus, accuracy associated with selection of appropriate code rates and/or modulation schemes may be enhanced.

Figure 2:
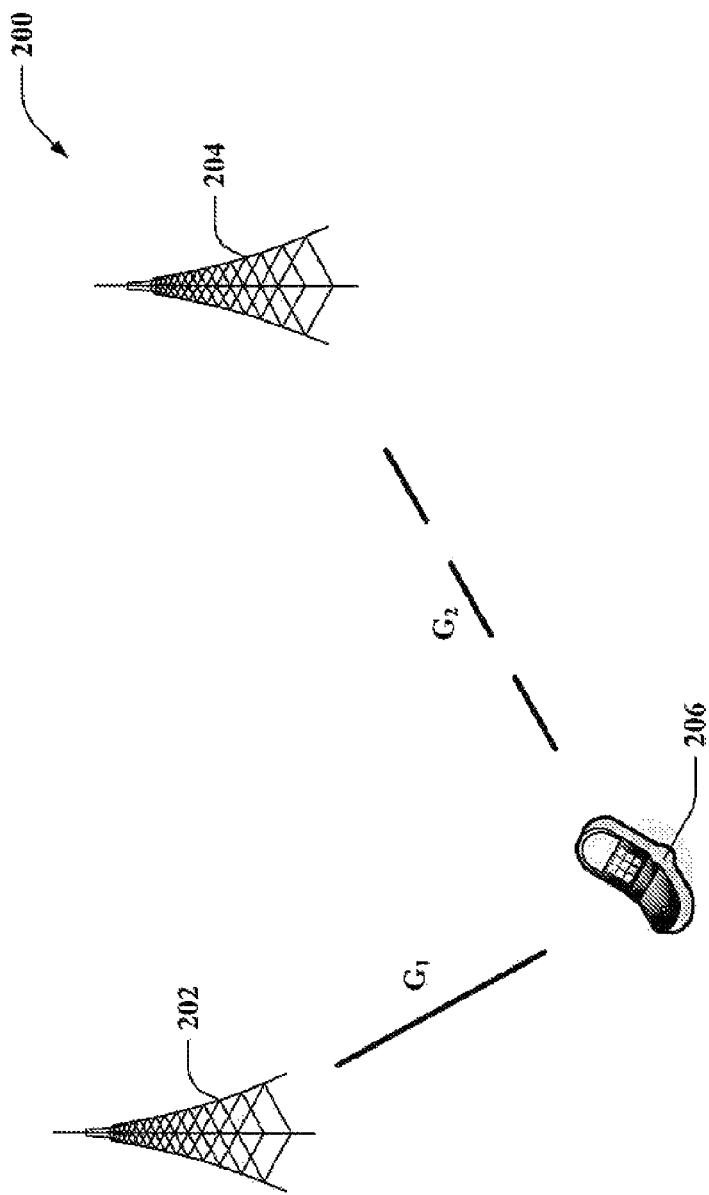
FIG. 2 is an illustration of an example wireless communication system in accordance with various aspects described herein.

Now referring to FIG. 2, illustrated is an example wireless communication system 200 in accordance with various aspects described herein. System 200 includes two base stations, base station 1 202 and base station 2 204, and a mobile device 206. It is to be appreciated, however, that the claimed subject matter contemplates utilizing substantially any number of base stations and substantially any number of mobile devices.

Mobile device 206 may compute an interference cost (e.g., relative path loss ratio), which can be utilized (e.g., in conjunction with a received maximum nominal power) to determine a maximum uplink transmit power, code rate, modulation scheme, and so forth. Mobile device 206 may be connected to base station 1 202. Further, a maximum nominal power for uplink transmission may be known to mobile device 206 and base station 1 202. For example, an assignment that may or may not include a maximum nominal power may be transmitted from base station 1 202 to mobile device 206 on the downlink. Further, mobile device 206 may select a code rate and/or modulation based at least in part upon the maximum nominal power and the interference cost, and employ the code rate and/or modulation for uplink transmission to base station 1 202.

Signals transmitted between base station 1 202 and mobile device 206 may be subject to a first path gain, $G_1$. Further, signals transferred between base station 2 204 and mobile device 206 may be subject to a second path gain, $G_2$. According to an example, mobile device 206 may determine the interference cost by evaluating $$\alpha = \frac{G_2}{G_1},$$

where $\alpha$ is the relative path loss ratio. For instance, if $\alpha$ is close to zero, mobile device 206 may be in close proximity to base station 1 202 and relatively far from base station 2 204, and if $\alpha$ is close to one, the distance to base station 1 202 from mobile device 206 may be more similar to the distance to base station 2 204 from mobile device 206.

Figure 3:
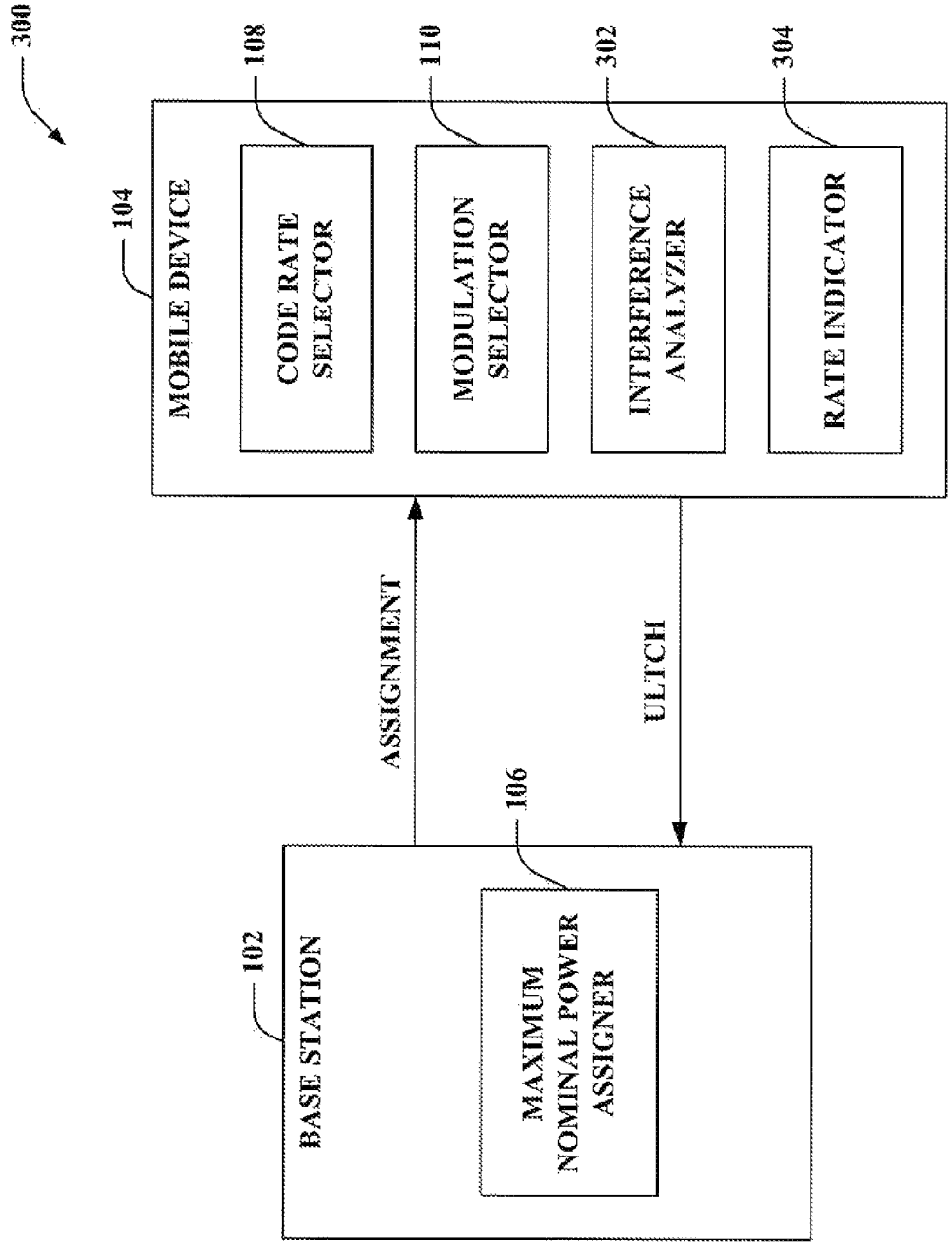
FIG. 3 is an illustration of an example system that evaluates interference cost in connection with power-based uplink assignment.

With reference to FIG. 3, illustrated is a system 300 that evaluates interference cost in connection with power-based uplink assignment. System 300 includes base station 102 that transmits a power-based assignment to mobile device 104 and receives traffic from mobile device 104 via an ULTCH. Base station 102 comprises maximum nominal power assigner 106 that generates a maximum nominal power that may be included in the assignment provided to mobile device 104. Additionally, mobile device 104 may include code rate selector 108 and modulation selector 110.

Further, mobile device 104 may include an interference analyzer 302 that measures an interference cost. Moreover, interference analyzer 302 adjusts a maximum transmit power that may be utilized by mobile device 104 for communication on the ULTCH based upon the interference cost. For example, interference analyzer 302 may utilize a formula known to both base station 102 and mobile device 104 to compute the adjusted maximum transmit power from the assigned maximum nominal power, estimated relative path gains, broadcasted load information, and so forth. The altered maximum transmit power may thereafter be employed by code rate selector 108 and/or modulation selector 110 to choose the code rate and/or modulation, respectively. For instance, in a system where there is a constraint based on interference, which is related to proximity of mobile device 104 to other base stations, base station 102 assigns a maximum nominal power and mobile device 102 computes the transmit power (e.g., actual power) based upon its proximity (e.g., by employing interference analyzer 302).

Interference analyzer 302 may utilize substantially any technique to determine the interference cost. According to the above example described in FIG. 2, the measure of interference cost may be $$\alpha = \frac{G_2}{G_1}.$$

Pursuant to another illustration, any number of base stations may be employed in system 300; thus, interference analyzer 302 may calculate the interference cost as $$\alpha = \frac{\sum_{l \infty 0} G_l}{G_0}, \text{ where } \sum_{l \neq 0} G_l$$

may be the sum of path gains between base stations, which suffer from interference from mobile device 104, and mobile device 104 and $G_0$ may be the path gain between base station 102 and mobile device 104. In accordance with a further example, base station 102 and disparate base station(s) (not shown) may transmit respective loading factors, s; therefore, interference analyzer 302 may determine the interference cost as a function of loading factors, such as, by evaluating $$\alpha = \frac{\sum_{l \infty 0} s_i G_i}{s_0 G_0}.$$

It is contemplated that any manner of determining the interference cost known by both base station 102 and mobile device 104 may be utilized in connection with the claimed subject matter.

Interference analyzer 302 may utilize the interference cost to modify a maximum transmit power that may be utilized by mobile device 104. According to an example, the modified maximum transmit power of mobile device 104 may be determined by interference analyzer 302 as $$P_{max} = \frac{1}{\alpha} P_{maxnom},$$

where $P_{max}$ is the modified maximum transmit power and $P_{max,nom}$ is the maximum nominal power (e.g., received from base station 102). According to an example, if α is close to zero, $P_{max}$ becomes large; thus, mobile device 104 may transmit with a high power (e.g., however, the power may be clipped at a maximum value). Pursuant to another illustration, if α is close to one, then mobile device 104 may be physically positioned nearby a disparate base station in addition to base station 102, and therefore, mobile device 104 may transmit with a lower maximum power (e.g., to constrain an amount of uplink interference). The modified maximum transmit power may be provided to code rate selector 108 and/or modulation selector 110 to elect a code rate and/or modulation.

Mobile device 104 may additionally include a rate indicator 304 that enables transmitting notification of a selected code rate (e.g., chosen by employing code rate selector 108) to base station 102. For example, rate indicator 304 may generate an indication of the selected code rate that may be transmitted in the assigned segment of the ULTCH (e.g., according to the assignment received from base station 102). Base station 102 may utilize the received indication to decode traffic encoded with the specified code rate received from mobile device 104 on the ULTCH.

Figure 4:
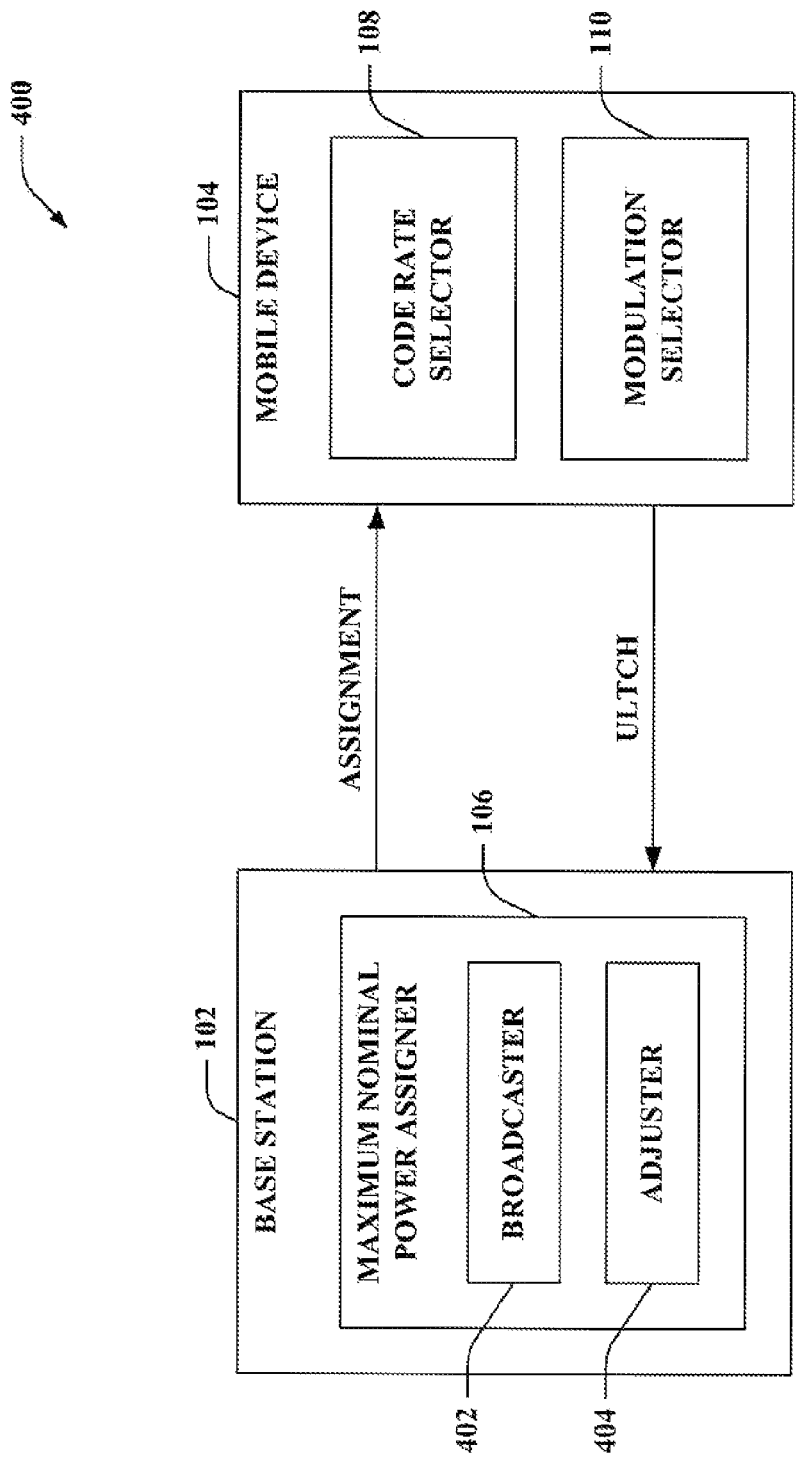
FIG. 4 is an illustration of an example system that bifurcates power-based uplink assignments.

Turning to FIG. 4, illustrated is a system 400 that bifurcates power-based uplink assignments. System 400 includes base station 102 that communicates with mobile device 104. Base station 102 further includes maximum nominal power assigner 106 that generates a maximum nominal power that may be included in an assignment provided to mobile device 104 via the downlink. Further, mobile device 104 may include code rate selector 108 and modulation selector 110 that yield a code rate and modulation scheme to be employed for transmission over the ULTCH based at least in part upon the assigned maximum nominal power.

Maximum nominal power assigner 106 may further comprise a broadcaster 402 and an adjuster 404. Broadcaster 402 and adjuster 404 enable splitting the assignment of the maximum nominal power into a first portion that can be common for substantially all assignments (e.g., broadcaster 402 yields the first portion) and a second portion that is assignment specific (e.g., adjuster 404 generates the second portion on a per assignment basis). Broadcaster 402 may generate the general portion of the maximum nominal power and thereafter transmit such information via a downlink broadcast channel (DLBCH). For example, the general portion yielded by broadcaster 402 may change slowly over time and may incorporate loading and interference. According to another example, the general portion need not be transmitted over the downlink; rather, the general portion may be agreed upon in a disparate manner by base station 102 and mobile device 104. Adjuster 404 may provide a user specific portion that adjusts the general portion for a particular assignment. For instance, adjuster 404 may signal such information via a DLTCCH. Pursuant to another example, adjuster 404 need not be utilized; rather, the maximum nominal power sent via broadcaster 402 may be employed without adjuster 404 tailoring such power on a per assignment basis.

According to an example, broadcaster 402 may generate the general portion of the maximum nominal power as follows:

$$P_{NOM} = \frac{\beta N_{TONE}}{SNR_{DCCH} N_{TCH}},$$

where β is an interference limit factor (e.g., 2 dB), $N_{TONE}$ is a number of tones. $SNR_{DCCH}$ is a signal-to-noise ratio associated with a DCCH and $N_{TCH}$ is a number of tones for the traffic channels. Moreover, adjuster 404 may yield the per assignment portion by evaluating $$\Delta P_{MAX} = \phi \frac{N_{TCH}}{N_i},$$

where φ is the specific portion of maximum nominal power assigned to the segment and $$\frac{N_i}{N_{TCH}}$$

is a fraction of TCH tones utilized in the segment. The maximum per tone TCH transmit power may be $$P_{TCH} \leq P_{NOM} * \Delta P_{MAX} * R_{pathLoss} * P_{DCCH},$$

$$\text{where } R_{pathLoss} = \frac{1}{\alpha}$$

is an uplink path loss ratio (in dB) estimated at mobile device 104 and $P_{DCCH}$ is the transit power on the dedicated control channel. It is to be appreciated, however, that the claimed subject matter is not limited to the aforementioned example.

Figure 5:
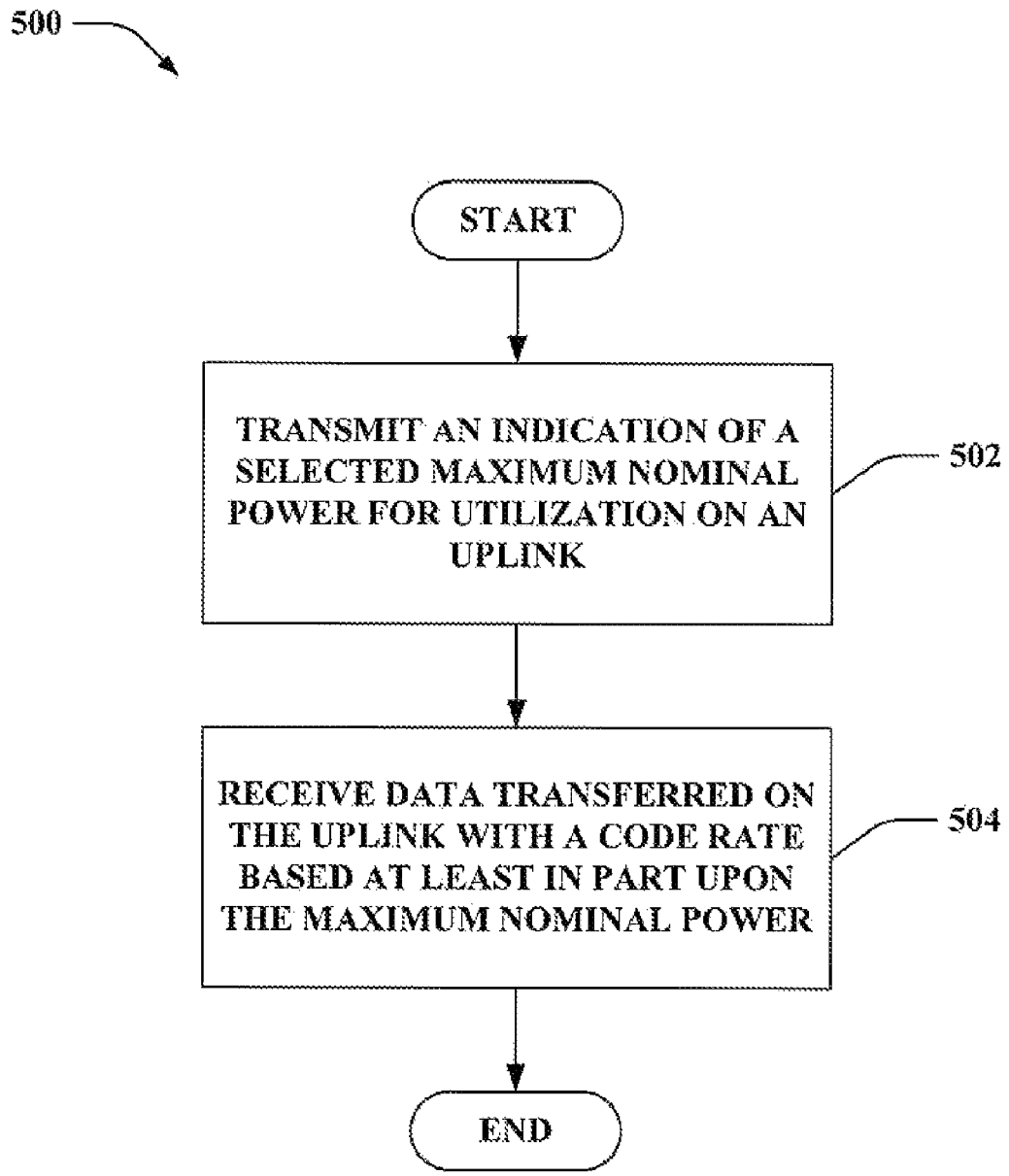
FIG. 5 is an illustration of an example methodology that facilitates providing power-related assignments for utilization in connection with uplink transmission.
Figure 6:
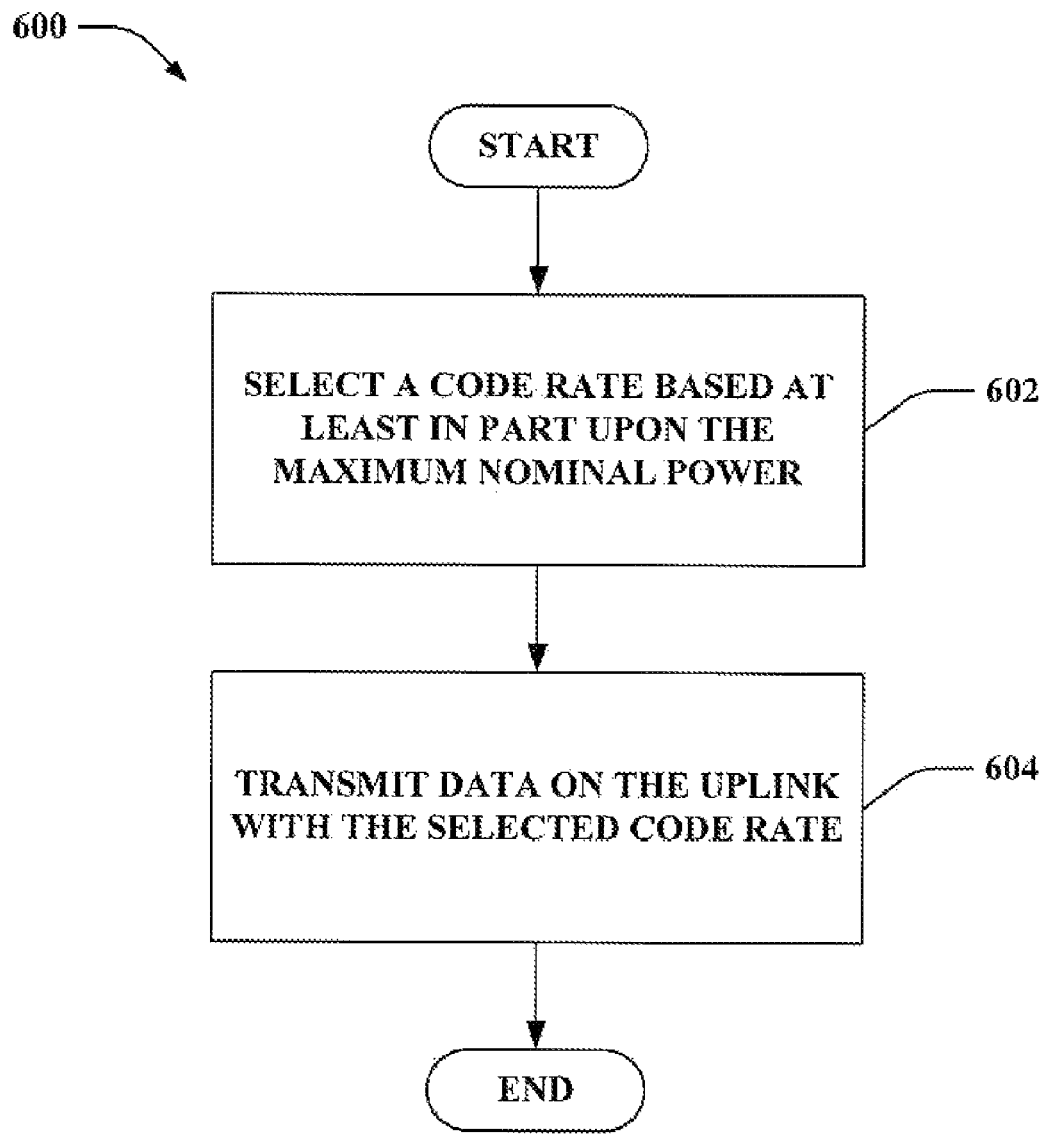
FIG. 6 is an illustration of an example methodology that facilitates selecting a code rate for uplink transmission at a mobile side.
Figure 7:
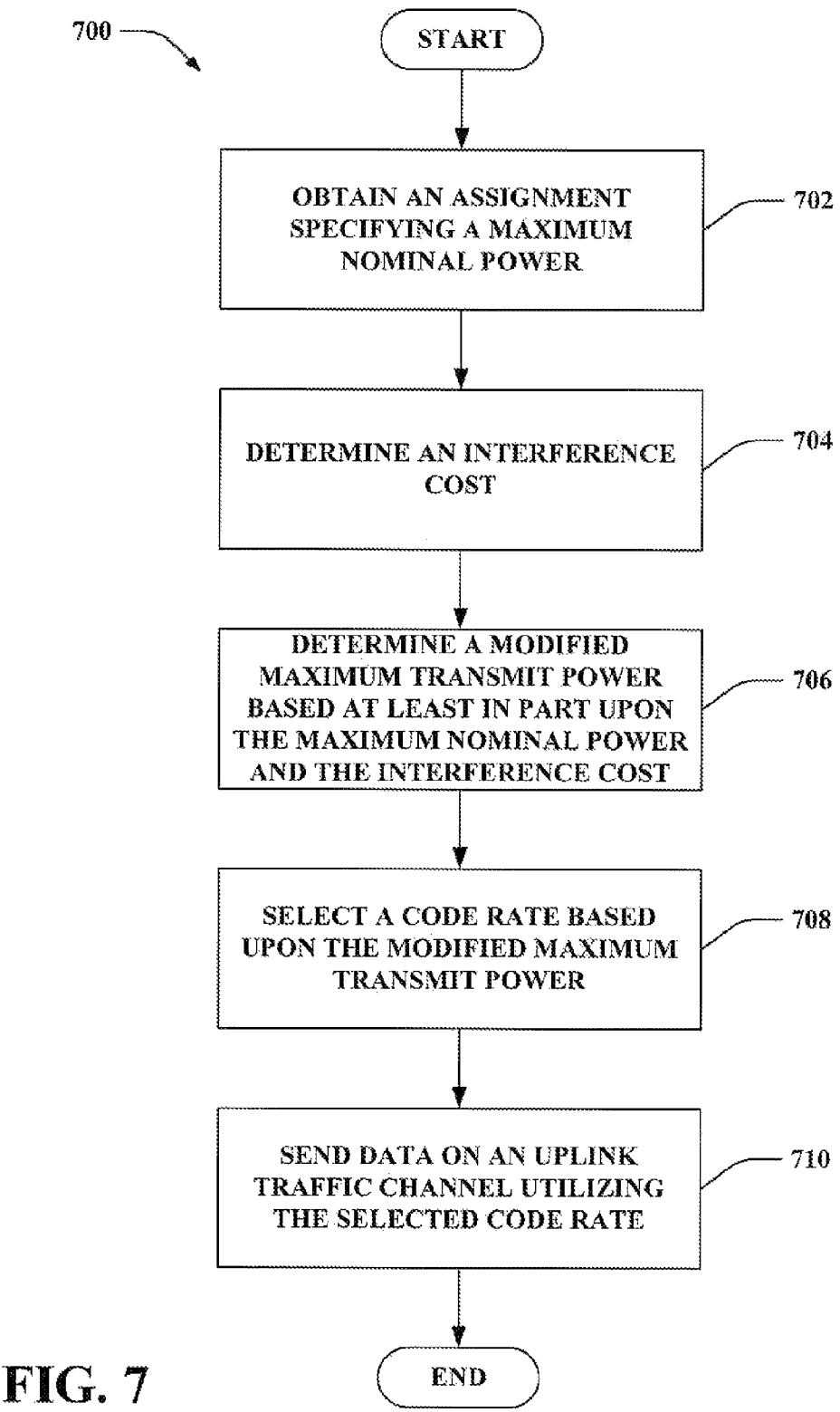
FIG. 7 is an illustration of an example methodology that facilitates evaluating interference cost in connection with mobile side election of a code rate for uplink transmission.

Referring to FIGS. 5-7, methodologies relating to power-based rate signaling for uplink scheduling are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates providing power-related assignments for utilization in connection with uplink transmission. At 502, an indication of a selected maximum nominal power for utilization on an uplink may be transmitted. For example, a base station may select a maximum nominal power for a particular mobile device. The maximum nominal power may be transmitted as part of an assignment, for instance. Further, the maximum nominal power may be a maximum transmit power relative to a dedicated power control signal. Moreover, the indication may be provided over one or more downlink channels to a mobile device. Pursuant to an example, the indication may be bifurcated; thus, a portion of the indication may be broadcast to a plurality of mobile devices (e.g., over a downlink broadcast channel), while a remainder of the indication may be directed to a particular one of the plurality of mobile devices (e.g., the remainder may be an adjustment to the broadcasted portion sent on a per assignment basis, transmitted on a downlink traffic control channel, . . . ). Additionally or alternatively, a loading factor may be transmitted to mobile devices for utilization in connection with determining an interference cost.

At 504, data transferred on the uplink with a code rate based at least in part upon me maximum nominal power may be received. According to an example, a rate notification may be received in an assigned segment (e.g., the rate notification may enable decoding the received data). Further, the received data may be associated with a modulation scheme selected based at least in part upon the maximum nominal power.

With reference to FIG. 6, illustrated is a methodology 600 that facilitates selecting a code rate for uplink transmission at a mobile side. At 602, a code rate may be selected based at least in part upon a maximum nominal power. The maximum nominal power (e.g., for uplink transmission) may be known by both a base station and a mobile device. The maximum nominal power may be a maximum transmit power relative to a dedicated control channel. For example, the maximum nominal power may be received (e.g., via a downlink, as part of an assignment, . . . ). According to another example, a default maximum nominal power may be erupted. By way of further illustration, a pre-agreed upon maximum nominal power may be employed. The code rate is selected at the mobile side. For example, any rate up to a maximum rate that corresponds to the maximum nominal power may be chosen. According to an illustration, the code rate may be elected as a function of traffic requirements of a mobile device, an amount of available power of the mobile device, an interference cost (e.g., associated with the uplink, relative path loss ratio, . . . ), and the like. Further, a modulation scheme may be selected based at least in part upon the maximum nominal power. Also, an indication (e.g., assignment) of an assigned block in time and frequency for uplink transmission may be obtained. At 604, data may be transmitted on the uplink with the selected code rate. Further, the data may be transferred with the selected modulation scheme and/or utilizing the assigned block in time and frequency. Pursuant to an example, an indication of the selected code rate may additionally be transmitted on the uplink.

Now referring to FIG. 7, illustrated is a methodology 700 that facilitates evaluating interference cost in connection with mobile side election of a code rate for uplink transmission. At 702, an assignment specifying a maximum nominal power may be obtained. At 704, an interference cost may be determined (e.g., at the mobile side). For example, the interference cost may be a relative path loss ratio. Further, the interference cost may be evaluated based upon received Beacon signals from a plurality of base stations. Moreover, the interference cost may be a function of proximity to each of the base stations. According to another example, the interference cost may be a function of loading factors received from the base stations or a combination (e.g., product, . . . ) of some or all of factors listed above. It is to be appreciated that any manner of determining the interference cost is intended to fall within the scope of the claimed subject matter.

At 706, a modified maximum transmit power may be determined based at least in part upon the maximum nominal power and the interference cost. For example, any manner known to both the base station and mobile device to compute the modified maximum transmit power from the assigned maximum nominal power, interference cost, etc. may be utilized. By way of illustration, the modified maximum transmit power may be $$P_{max} = \frac{1}{\alpha} P_{max,nom},$$

where $P_{max}$ is the modified maximum transmit power, $P_{max,nom}$ is the maximum nominal power; received from a base station and $\alpha$ is the interference cost (e.g., relative path loss ratio). At 708, a code rate may be selected based upon the modified maximum transmit power. For example, the modified maximum transmit power may be utilized to identify a maximum code rate; thus, any code rate less than or equal to the maximum code rate may be chosen for uplink transmission. Moreover, a modulation scheme may be chosen as a function of the modified maximum transmit power. At 710, data may be sent on an uplink traffic channel utilizing the selected code rate. Further, for example, the data may employ the selected modulation scheme.

It will be appreciated that, in accordance with one or more aspects described herein, inferences can be made regarding selecting code rates in connection with utilizing power-based rate signaling for transmission on an uplink. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding selecting whether to transmit on an uplink during an assigned segment (e.g., based upon traffic requirements, channel conditions, . . . ). By way of further illustration, an inference may be made to evaluate an interference cost associated with uplink transmission; the inferred interference cost may be utilized to determine whether to transmit on the uplink and/or characteristics to employ in connection with uplink transmission (e.g., code rate, modulation, . . . ). Moreover, an inference may be made regarding whether to transmit an assignment specific adjustment to common broadcasted power related information. It will be appreciated that the foregoing examples are illustrative in nature and are not intended to limit the number of inferences that can be made or the manner in which such inferences are made in conjunction with the various embodiments and/or methods described herein.

Figure 8:
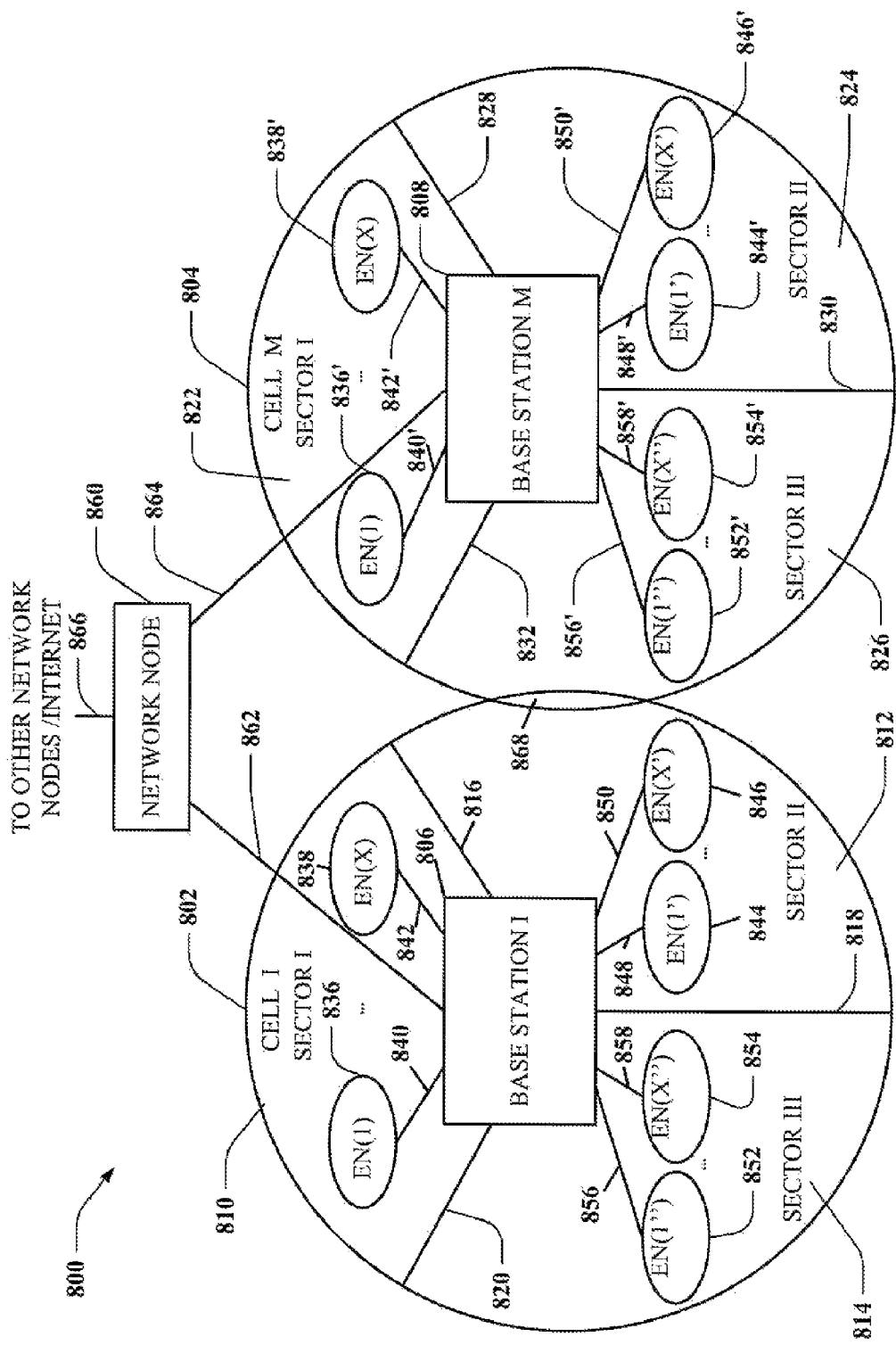
FIG. 8 is an illustration of an example communication system implemented in accordance with various aspects including multiple cells.

FIG. 8 depicts an example communication system 800 implemented in accordance with various aspects including multiple cells: cell I 802, cell M 804. Note that neighboring cells 802, 804 overlap slightly, as indicated by cell boundary region 868, thereby creating potential for signal interference between signals transmitted by base stations in neighboring cells. Each cell 802, 804 of system 800 includes three sectors. Cells which have not be subdivided into multiple sectors (N=1), cells with two sectors (N=2) and cells with more than 3 sectors (N>3) are also possible in accordance with various aspects. Cell 802 includes a first sector, sector I 810, a second sector, sector II 812, and a third sector, sector III 814. Each sector 810, 812, 814 has two sector boundary regions; each boundary region is shared between two adjacent sectors.

Sector boundary regions provide potential for signal interference between signals transmitted by base stations in neighboring sectors. Line 816 represents a sector boundary region between sector I 810 and sector II 812; line 818 represents a sector boundary region between sector II 812 and sector III 814; line 820 represents a sector boundary region between sector III 814 and sector I 810. Similarly, cell M 804 includes a first sector, sector I 822, a second sector, sector II 824, and a third sector, sector III 826. Line 828 represents a sector boundary region between sector I 822 and sector II 824; line 830 represents a sector boundary region between sector II 824 and sector III 826; line 832 represents a boundary region between sector III 826 and sector I 822. Cell I 802 includes a base station (BS), base station I 806, and a plurality of end nodes (ENs) (e.g., mobile devices) in each sector 810, 812, 814. Sector I 810 includes EN(1) 836 and EN(X) 838 coupled to BS 806 via wireless links 840, 842, respectively; sector II 812 includes EN(1') 844 and EN(X') 846 coupled to BS 806 via wireless links 848, 850, respectively; sector III 814 includes EN(1") 852 and EN(X") 854 coupled to BS 806 via wireless links 856, 858, respectively. Similarly, cell M 804 includes base station M 808, and a plurality of end nodes (ENs) in each sector 822, 824, 826. Sector I 822 includes EN(1) 836' and EN(X) 838' coupled to RS M 808 via wireless links 840', 842', respectively; sector II 824 includes EN(1') 844' and EN(X') 846' coupled to BS M 808 via wireless links 848', 850', respectively; sector 3 826 includes EN(1") 852' and EN(X") 854' coupled to BS 808 via wireless links 856', 858', respectively.

System 800 also includes a network node 860 which is coupled to BS I 806 and BS M 808 via network links 862, 864, respectively. Network node 860 is also coupled to other network nodes, e.g., other base stations, AAA server nodes, intermediate nodes, routers, etc, and the Internet via network link 866. Network links 862, 864, 866 may be, e.g., fiber optic cables. Each end node, e.g., EN(1) 836 may be a wireless terminal including a transmitter as well as a receiver. The wireless terminals, e.g., EN(1) 836 may move through system 800 and may communicate via wireless links with the base station in the cell in which the EN is currently located. The wireless terminals, (WTs), e.g., EN(1) 836, may communicate: with peer nodes, e.g., other WTs in system 800 or outside system 800 via a base station, e.g., BS 806, and/or network node 860, WTs, e.g., EN(1) 836 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones.

Figure 9:
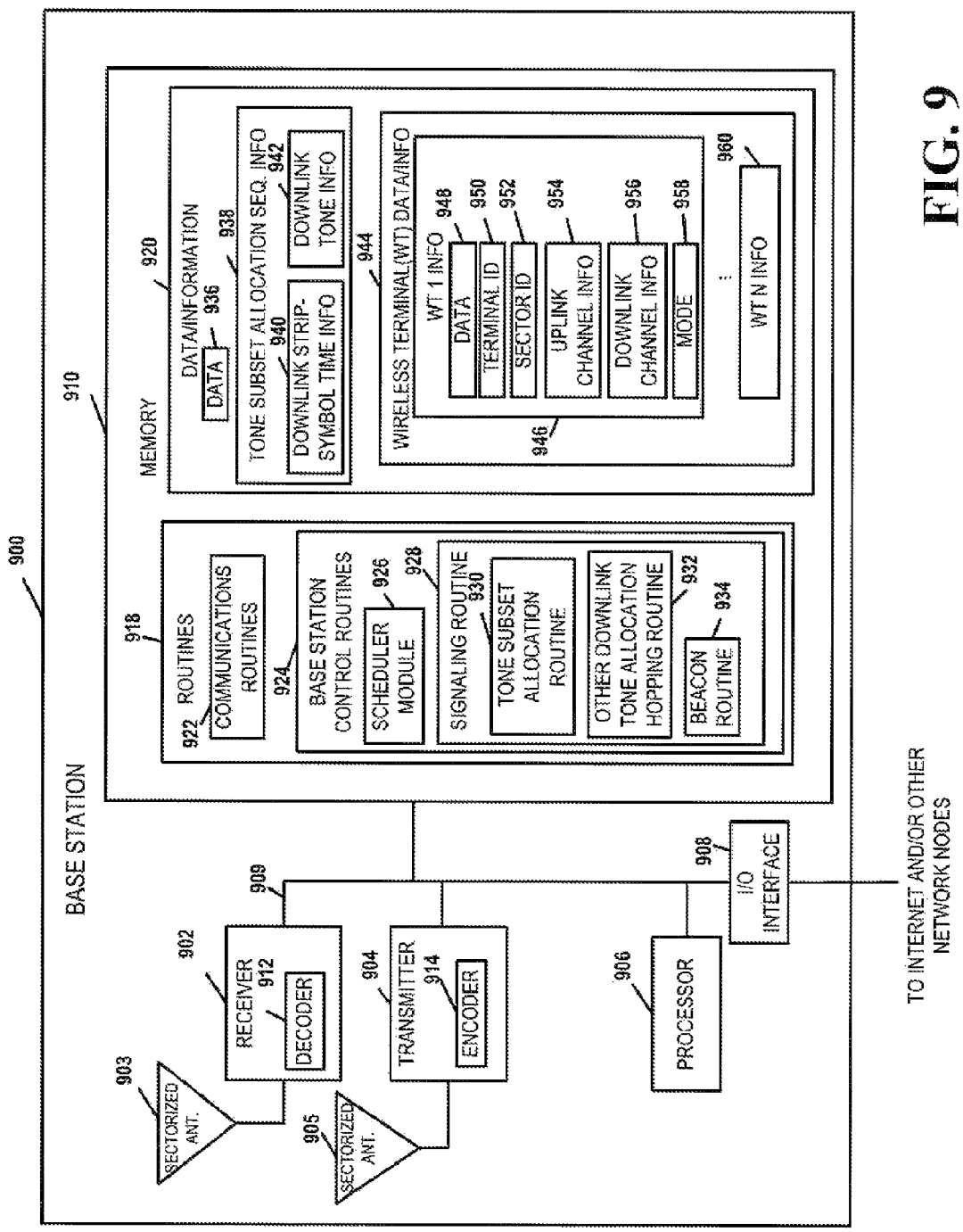
FIG. 9 is an illustration of an example base station in accordance with various aspects.

FIG. 9 illustrates an example base station 900 in accordance with various aspects. Base station 900 implements tone subset allocation sequences, with different tone subset allocation sequences generated for respective different sector types of the cell. Base station 900 may be used as any one of base stations 806, 808 of the system 800 of FIG. 8. The base station 900 includes a receiver 902, a transmitter 904, a processor 906, e.g., CPU, an input/output interface 908 and memory 910 coupled together by a bus 909 over which various elements 902, 904, 906, 908, and 910 may interchange data and information.

Sectorized antenna 903 coupled to receiver 902 is used for receiving data and other signals, e.g., channel reports, from wireless terminals transmissions from each sector within the base station's cell. Sectorized antenna 905 coupled to transmitter 904 is used for transmitting data and other signals, e.g., control signals, pilot signal, beacon signals, etc. to wireless terminals 1000 (see FIG. 10) within each sector of the base station's cell. In various aspects, base station 900 may employ multiple receivers 902 and multiple transmitters 904, e.g., an individual receiver 902 for each sector and an individual transmitter 904 for each sector. Processor 906, may be, e.g., a general purpose central processing unit (CPU). Processor 906 controls operation of base station 900 under direction of one or more routines 918 stored in memory 910 and implements the methods. I/O interface 908 provides a connection to other network nodes, coupling the BS 900 to other base stations, access routers, AAA server nodes, etc., other networks, and the Internet. Memory 910 includes routines 918 and data/information 920.

Data/information 920 includes data 936, tone subset allocation sequence information 938 including downlink strip-symbol time information 940 and downlink tone information 942, and wireless terminal (WT) data/info 944 including a plurality of sets of WT information: WT 1 info 946 and WT N info 960. Each set of WT info, e.g., WT 1 info 946 includes data 948, terminal ID 950, sector ID 952, uplink channel information 954, downlink channel information 956, and mode information 958.

Routines 918 include communications routines 922 and base station control routines 924. Base station control routines 924 includes a scheduler module 926 and signaling routines 928 including a tone subset allocation routine 930 for strip-symbol periods, other downlink tone allocation hopping routine 932 for the rest of symbol periods, e.g., non strip-symbol periods, and a beacon routine 934.

Data 936 includes data to be transmitted that will be sent to encoder 914 of transmitter 904 for encoding prior to transmission to WTs, and received data from WTs that has been processed through decoder 912 of receiver 902 following reception. Downlink strip-symbol time information 940 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink lone information 942 includes information including a carrier frequency assigned to the base station 900, the number and frequency of tones, and the set of tone subsets to be allocated to the strip-symbol periods, and other cell and sector specific values such as slope, slope index and sector type.

Data 948 may include data that WT1 1000 has received from a peer node, data that WT 1 1000 desires to be transmitted to a peer node, and downlink channel quality report feedback information. Terminal ID 950 is a base station 900 assigned ID that identifies WT 1 1000. Sector ID 952 includes information identifying the sector in which WT1 1000 is operating. Sector ID 952 can be used, for example, to determine the sector type. Uplink channel information 954 includes information identifying channel segments that have been allocated by scheduler 926 for WT1 1000 to use, e.g., uplink traffic channel segments for data, dedicated uplink control channels for requests, power control, timing control, etc. Each uplink channel assigned to WT1 1000 includes one or more logical tones, each logical tone following an uplink hopping sequence. Downlink channel information 956 includes information identifying channel segments that have been allocated by scheduler 926 to carry data and/or information to WT1 1000, e.g., downlink traffic channel segments for user data. Each downlink channel assigned to WT1 1000 includes one or more logical tones, each following a downlink hopping sequence. Mode information 958 includes information identifying the state of operation of WT1 1000, e.g. sleep, hold, on.

Communications routines 922 control the base station 900 to perform various communications operations and implement various communications protocols. Base station control routines 924 are used to control the base station 900 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 928 controls the operation of receiver 902 with its decoder 912 and transmitter 904 with its encoder 914. The signaling routine 928 is responsible for controlling the generation of transmitted data 936 and control information. Tone subset allocation routine 930 constructs the tone subset to be used in a strip-symbol period using the method of the aspect and using data/information 920 including downlink strip-symbol time info 940 and sector ID 952. The downlink tone subset allocation sequences will be different for each sector type in a cell and different for adjacent cells. The WTs 1000 receive the signals in the strip-symbol periods in accordance with the downlink tone subset allocation sequences; the base station 900 uses the same downlink tone subset allocation sequences in order to generate the transmitted signals. Other downlink tone allocation hopping routine 932 constructs downlink tone hopping sequences, using information including downlink tone information 942, and downlink channel information 956, for the symbol periods other than the strip-symbol periods. The downlink data tone hopping sequences are synchronized across the sectors of a cell. Beacon routine 934 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Figure 10:
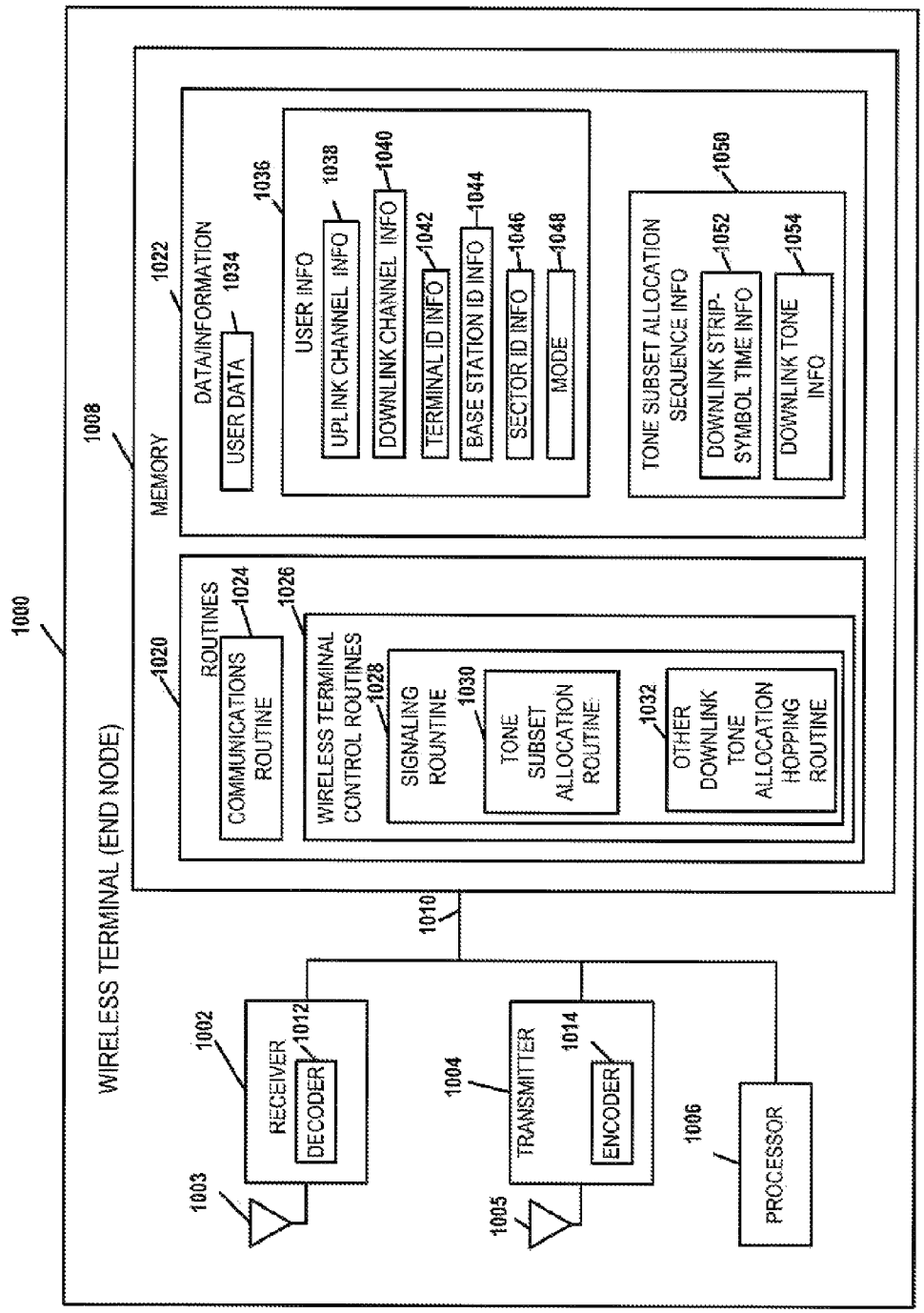
FIG. 10 is an illustration of an example wireless terminal (e.g., mobile device, end node, . . . ) implemented in accordance with various aspects described herein.

FIG. 10 illustrates an example wireless terminal (e.g., end node, mobile device, . . . ) 1000 which can be used as any one of the wireless terminals (e.g., end nodes, mobile devices, . . . ), e.g., EN(1) 836, of the system 800 shown in FIG. 8. Wireless terminal 1000 implements the tone subset allocation sequences. The wireless terminal 1000 includes a receiver 1002 including a decoder 1012, a transmitter 1004 including an encoder 1014, a processor 1006, and memory 1008 which are coupled together by a bus 1010 over which the various elements 1002, 1004, 1006, 1008 can interchange data and information. An antenna 1003 used for receiving signals from a base station 900 is coupled to receiver 1002. An antenna 1005 used for transmitting signals, e.g., to base station 900 is coupled to transmitter 1004.

The processor 1006, e.g., a CPU controls the operation of the wireless terminal 1000 and implements methods by executing routines 1020 and using data/information 1022 in memory 1008.

Data/information 1022 includes user data 1034, user information 1036, and tone subset allocation sequence information 1050. User data 1034 may include data, intended for a peer node, which will be routed to encoder 1014 for encoding prior to transmission by transmitter 1004 to base station 900, and data received from the base station 900 which has been processed by the decoder 1012 in receiver 1002. User information 1036 includes uplink channel information 1038, downlink channel information 1040, terminal ID information 1042, base station ID information 1044, sector ID information 1046, and mode information 1048. Uplink channel information 1038 includes information identifying uplink channels segments that have been assigned by base station 900 for wireless terminal 1000 to use when transmitting to the base station 900. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1040 includes information identifying downlink channel segments that have been assigned by base station 900 to WT 1000 for use when BS 900 is transmitting data/information to WT 1000. Downlink channels may include downlink traffic channels and assignment channels, each downlink channel including one or more logical tone, each logical tone following a downlink hopping sequence, which is synchronized between each sector of the cell.

User info 1036 also includes terminal ID information 1042, which is a base station 900 assigned identification, base station ID information 1044 which identifies the specific base station 900 that WT has established communications with, and sector ID info 1046 which identifies the specific sector of the cell where WT 1000 is presently located. Base station ID 1044 provides a cell slope value and sector ID info 1046 provides a sector index type; the cell slope value and sector index type may be used to derive tone hopping sequences. Mode information 1048 also included in user info 1036 identifies whether the WT 1000 is in sleep mode, hold mode, or on mode.

Tone subset allocation sequence information 1050 includes downlink strip-symbol time information 1052 and downlink tone information 1054. Downlink strip-symbol time information 1052 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1054 includes information including a carrier frequency assigned to the base station 900, the number and frequency of tones, and the set of tone subsets to be allocated to the strip-symbol periods, and other cell and sector specific values such as slope, slope index and sector type.

Routines 1020 include communications routines 1024 and wireless terminal control routines 1026. Communications routines 1024 control the various communications protocols used by WT 1000. Wireless terminal control routines 1026 control basic wireless terminal 1000 functionality including the control of the receiver 1002 and transmitter 1004. Wireless terminal control routines 1026 include the signaling routine 1028. The signaling routine 1028 includes a tone subset allocation routine 1030 for the strip-symbol periods and another downlink tone allocation hopping routine 1032 for the rest of symbol periods, e.g., non strip-symbol periods. Tone subset allocation routine 1030 uses user data/information 1022 including downlink channel information 1040, base station ID info 1044, e.g., slope index and sector type, and downlink tone information 1054 in order to generate the downlink tone subset allocation sequences in accordance with some aspects and process received data transmitted from base station 900. Other downlink tone allocation hopping routine 1030 constructs downlink tone hopping sequences, using information including downlink tone information 1054, and downlink channel information 1040, for the symbol periods other than the strip-symbol periods. Tone subset allocation routine 1030, when executed by processor 1006, is used to determine when and on which tones the wireless terminal 1000 is to receive one or more strip-symbol signals from the base station 900. The uplink tone allocation hopping routine 1030 uses a tone subset allocation function, along with information received from the base station 900, to determine the tones in which it should transmit on.

Figure 11:
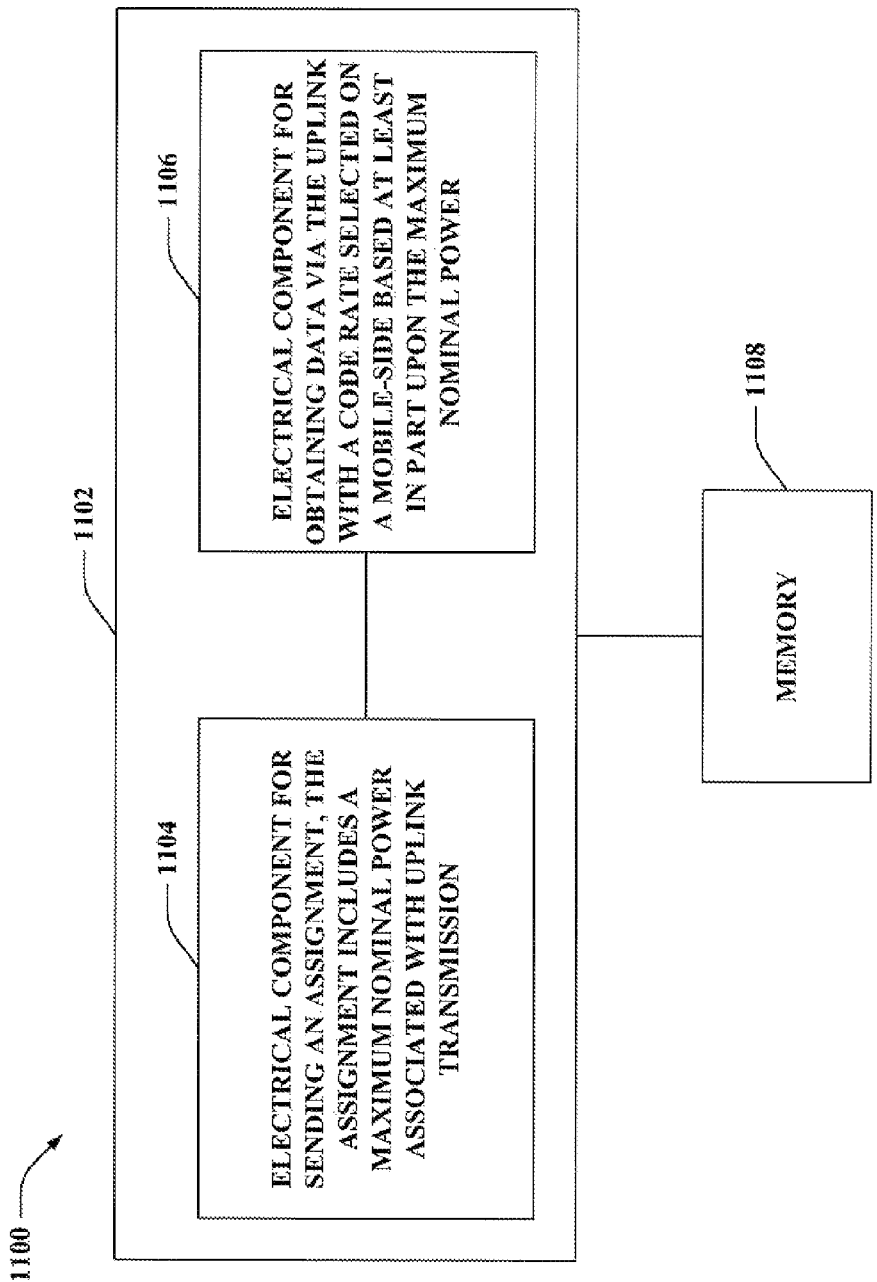
FIG. 11 is an illustration of an example system that provides power-based rate signaling.

With reference to FIG. 11, illustrated is a system 1100 that provides power-based rate signaling. For example, system 1100 may reside at least partially within a base station. It is to be appreciated that system 1100 is represented as including functional blocks, which may be functional blocks that represent functions implemented by a processor, software, or combination thereof (e.g., firmware). System 1100 includes a logical grouping 1102 of electrical components that can act in conjunction. For instance, logical grouping 1102 may include an electrical component for sending an assignment 1104, where the assignment may include a maximum nominal power associated with an uplink transmission. For example, the maximum nominal power may be provided as part of one transmission and/or a plurality of transmissions (e.g., bifurcated indication of the maximum nominal power). Further, logical grouping 1102 may comprise an electrical component for obtaining data via the uplink with a code rate selected on a mobile side and based at least in part upon the maximum nominal power 1106. For example, the data may additionally or alternatively be formatted utilizing a modulation scheme chosen on the mobile-side based at least in part upon the maximum nominal power. Additionally, system 1100 may include a memory 1108 that retains instructions for executing functions associated with electrical components 1104 and 1106. While shown as being external to memory 1108, it is to be understood that one or more of electrical components 1104 and 1106 may exist within memory 1108.

Figure 12:
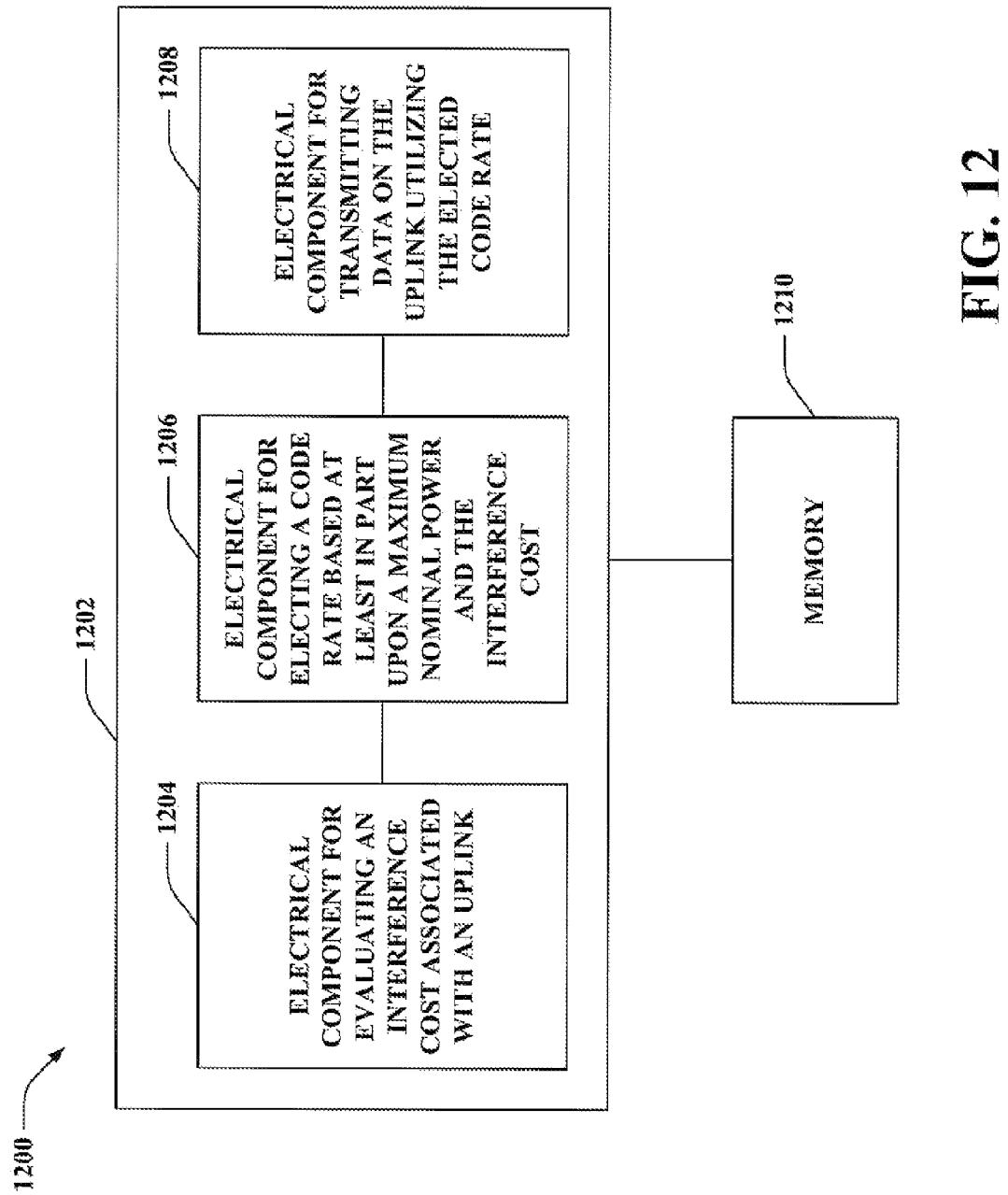
FIG. 12 is ail illustration of an example system that elects a code rate for uplink transmission as a function of received power-related assignments.

Now referring to FIG. 12, illustrated is a system 1200 that elects a code rate for uplink transmission as a function of received power-related assignments. System 1200 may reside within a mobile device, for instance. As depicted, system 1200 includes functional blocks that may represent functions implemented by a processor, software, or combination thereof (e.g., firmware). System 1200 includes a logical grouping 1202 of electrical components that facilitate controlling election of an uplink code rate. Logical grouping 1202 may include an electrical component for evaluating an interference cost associated with an uplink 1204. By way of example, the interference cost may be a function of proximity to various base stations (e.g., as analyzed based upon received Beacon signals, path gains, loading factors, . . . ). Further, logical grouping 1202 may comprise an electrical component for electing a code rate based at least in part upon a maximum nominal power and the interference cost 1206. For instance, a maximum code rate may be determined, and the maximum code rate and/or a diminished code rate may be elected. Additionally or alternatively, a modulation may be determined based at least in part upon the maximum nominal power and/or the interference cost. Also, logical grouping 1202 may include an electrical component for transmitting data on the uplink utilizing the elected code rate 1208. For example, an indication of the elected code rate may be provided over the uplink. Additionally, system 1200 may include a memory 1210 that retains instructions for executing functions associated with electrical components 1204, 1206, and 1208. While shown as being external to memory 1210, it is to be understood that electrical components 1204, 1206, and 1208 may exist within memory 1210.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments ate possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of operating a wireless terminal, comprising:
receiving, from a first base station, information indicating a base station assigned maximum nominal transmit power for uplink transmissions, said information indicating the base station assigned maximum nominal transmit power being received in two parts, a first one of said two parts being received in a broadcast transmission transmitted over a broadcast channel to multiple wireless terminals, a second one of said two parts being specific to said wireless terminal and being received via a signal directed to said wireless terminal on a downlink traffic control channel;

determining a modified maximum transmit power based on the base station assigned maximum nominal transmit power, and a first path gain of a first path between the wireless terminal and the first base station, and a second path gain of a second path between the wireless terminal and a second base station;

selecting a code rate based at least in part upon said determined modified maximum transmit power; and transmitting data to said first base station on an uplink with the selected code rate.

2. The method of claim 1, wherein determining a modified maximum transmit power includes applying a multiplier factor to the base station assigned maximum nominal transmit power to produce an increase in transmission power with respect to the base station assigned maximum nominal transmit power when the second path between the wireless terminal and the second base station is worse than the first path between the wireless terminal and the first base station and to produce a decrease in transmission power with respect to the base station assigned maximum nominal transmit power when the second path is better than the first path; and wherein the method further comprises:
selecting a modulation scheme for uplink transmission based at least in part upon the determined modified maximum transmit power; and
wherein transmitting said data includes using the selected modulation scheme.

3. The method of claim 1, wherein the base station assigned maximum nominal transmit power is a maximum transmit power relative to a dedicated power control channel.

4. The method of claim 1, wherein said signal directed to said wireless terminal is an assignment that allocates a block in time and frequency for uplink transmission.

5. The method of claim 1, wherein receiving, from the first base station, information indicating a base station assigned maximum nominal transmit power includes receiving an assignment that includes the base station assigned maximum nominal transmit power.

6. The method of claim 5, wherein the assignment further includes an allocation of a block in time and frequency for uplink transmission.

7. The method of claim 1, wherein receiving, from the first base station, information indicating a base station assigned maximum nominal transmit power includes receiving an assignment that includes an assignment specific adjustment to a default maximum nominal power.

8. The method of claim 7, wherein receiving an assignment specific adjustment includes receiving the assignment specific adjustment on a traffic control channel.

9. The method of claim 7, wherein receiving, from the first base station, information indicating a base station assigned maximum nominal transmit power includes receiving the default maximum nominal power on a broadcast channel.

10. The method of claim 1, wherein selecting the code rate further comprises electing a particular code rate that is less than or equal to a maximum code rate corresponding to the base station assigned maximum nominal transmit power.

11. The method of claim 1, further comprising selecting the code rate as a function of traffic requirements, an available power and/or an interference cost.

12. The method of claim 1, wherein transmitting data to said first base station includes:
transmitting data at a power level lower than said base station assigned maximum nominal transmit power when said determined modified maximum transmit power is lower than said base station assigned maximum nominal transmit power.

13. The method of claim 1, further comprising:
determining an interference cost based on a relative path loss ratio; and
wherein determining a modified maximum transmit power includes multiplying the base station assigned maximum nominal transmit power by said determined interference cost.

14. The method of claim 13, wherein determining the interference cost further comprises:
evaluating received Beacon signals from a plurality of base stations to determine path gains corresponding to different ones of said plurality of base stations.

15. The method of claim 13, further comprising:
receiving loading factors from a plurality of base stations; and
wherein said interference cost is a function of the loading factors.

16. The method of claim 13, wherein the interference cost is based on both a relative path loss ratio and loading factors obtained from a plurality of base stations.

17. A wireless terminal comprising:
a memory that retains instructions related to: receiving, from a first base station, information indicating a base station assigned maximum nominal transmit power for uplink transmissions, said information indicating the base station assigned maximum nominal transmit power being received in two parts, a first one of said two parts being received in a broadcast transmission transmitted over a broadcast channel to multiple wireless terminals, a second one of said two parts being specific to said wireless terminal and being received via a signal directed to said wireless terminal on a downlink traffic control channel; determining a modified maximum transmit power based on the base station assigned maximum nominal transmit power, a first path gain of a first path between the wireless terminal and the first base station, and a second path gain of a second path between the wireless terminal and a second base station; selecting a code rate based, at least in part, upon the determined modified maximum transmit power, and transmitting data to said first base station on an uplink traffic channel utilizing the selected code rate; and
a processor, coupled to the memory, configured to execute the instructions retained in the memory.

18. The wireless terminal of claim 17, wherein the memory further retains instructions for obtaining an assignment that includes the base station assigned maximum nominal transmit power.

19. The wireless terminal of claim 17,
wherein determining a modified maximum transmit power includes applying a multiplier factor to said base station assigned maximum nominal transmit power to produce an increase in transmission power with respect to the base station assigned maximum nominal transmit power when the second path between the wireless terminal and the second base station is worse than the first path between the wireless terminal and the first base station and to produce a decrease in transmission power with respect to the base station assigned maximum nominal transmit power when the second path is better than the first path; and wherein the memory further retains instructions for choosing a modulation based upon the modified maximum transmit power.

20. The wireless terminal of claim 17, wherein the memory further retains instructions for transmitting an indication of the selected code rate via the uplink traffic channel.

21. The wireless terminal of claim 17 wherein the memory further comprises instructions for analyzing Beacon signals from a plurality of base stations to evaluate an interference cost.

22. A wireless terminal comprising:
means for receiving, from a first base station, information indicating a base station assigned maximum nominal transmit power for uplink transmissions, said means for receiving including means for receiving said information indicating the base station assigned maximum nominal transmit power in two parts, a first one of said two parts being received in a broadcast transmission transmitted over a broadcast channel to multiple wireless terminals, a second one of said two parts being specific to said wireless terminal and being received via a signal directed to said wireless terminal on a downlink traffic control channel;
means for determining a modified maximum transmit power based on the base station assigned maximum nominal transmit power, and a first path gain of a first path between the wireless terminal and the first base station, and a second path gain of a second channel between the wireless terminal and a second base station;
means for electing a code rate based at least in part upon the determined modified maximum transmit power; and
means for transmitting data to said first base station on the uplink utilizing the elected code rate.

23. The wireless terminal of claim 22, further comprising means for receiving an assignment that includes the base station assigned maximum nominal transmit power.

24. The wireless terminal of claim 22, wherein said means for receiving, from the first base station, information indicating a base station assigned maximum nominal transmit power for uplink transmissions receive said second one of said two parts specific to said wireless terminal in a traffic channel assignment communicated on said downlink traffic control channel.

25. The wireless terminal of claim 22, further comprising means for selecting a modulation scheme for transmitting on the uplink.

26. A non-transitory machine-readable medium for use in a wireless terminal having stored thereon machine-executable instructions for:
receiving, from a first base station, information indicating a base station assigned maximum nominal transmit power for uplink transmissions, said information indicating the base station assigned maximum nominal transmit power being received in two parts, a first one of said two parts being received in a broadcast transmission transmitted over a broadcast channel to multiple wireless terminals, a second one of said two parts being specific to said wireless terminal and being received via a signal directed to said wireless terminal on a downlink traffic control channel;
determining a modified maximum transmit power based on the base station assigned maximum nominal transmit power, a first path gain of a first channel between the wireless terminal and the first base station, and a second path gain of a second channel between the wireless terminal and a second base station;
selecting a code rate and a modulation scheme for uplink transmission based upon the determined modified maximum transmit power; and
transmitting data to said first base station with the selected code rate and the modulation scheme on an uplink traffic channel.

27. The non-transitory machine-readable medium of claim 26, the machine-executable instructions further comprise transmitting a notification of the selected code rate on the uplink traffic channel.

28. In a wireless communication system, a wireless terminal comprising:
a processor configured to:
receive, from a first base station, information indicating a base station assigned maximum nominal uplink transmit power, said information indicating a base station assigned maximum nominal transmit power being received in two parts, a first one of said two parts being received in a broadcast transmission transmitted over a broadcast channel to multiple wireless terminals, a second one of said two parts being specific to said wireless terminal and being received via a signal directed to said wireless terminal on a downlink traffic control channel;
determining a modified maximum transmit power based on the base station assigned maximum nominal uplink transmit power, a first path gain of a first path between the wireless terminal and the first base station, and a second gain of a second path between the wireless terminal and a second base station;
choose an uplink code rate based upon the determined modified maximum transmit power; and
transmit traffic to said first base station on an uplink utilizing the uplink code rate.

29. The method of claim 1, wherein said step of determining a modified maximum transmit power includes utilizing a formula which uses the first path gain, the second path gain and the base station assigned maximum nominal transmit power as inputs to determine the modified maximum transmit power.

* * * * *